United States Patent [19]

Allen

[11] Patent Number: 5,072,987
[45] Date of Patent: Dec. 17, 1991

[54] RETRACTABLE CYCLE ROOF

[76] Inventor: Marshall T. Allen, 7344 W. Peoria Ave., #1, Peoria, Ariz. 85345

[21] Appl. No.: 539,204

[22] Filed: Jun. 18, 1990

[51] Int. Cl.$^5$ .............................................. B60J 7/08
[52] U.S. Cl. .................................. 296/107; 296/78.1; 296/79; 296/111; 296/124
[58] Field of Search ................ 296/78.1, 79, 107, 111, 296/118, 124

[56] References Cited

U.S. PATENT DOCUMENTS

| 670,268 | 3/1901 | Braun | 296/111 |
|---|---|---|---|
| 714,016 | 11/1902 | McMullen | 296/79 |
| 780,141 | 1/1905 | Thomas | 296/118 |
| 825,686 | 7/1906 | Weidner | 296/111 |
| 956,563 | 5/1910 | Bertrand | 296/111 |
| 3,284,130 | 11/1966 | Michael | 296/78.1 |
| 3,773,379 | 11/1973 | Loiseau | 296/107 |
| 4,440,436 | 4/1984 | Giddens et al. | 296/78.1 X |
| 4,681,362 | 7/1987 | Taylor | 296/78.1 |

FOREIGN PATENT DOCUMENTS

| 2243636 | 3/1974 | Fed. Rep. of Germany | 296/78.1 |
|---|---|---|---|
| 2302994 | 7/1974 | Fed. Rep. of Germany | 296/78.1 |
| 157995 | 2/1921 | United Kingdom | 296/78.1 |
| 204876 | 10/1923 | United Kingdom | 296/78.1 |

Primary Examiner—Dennis H. Pedder
Assistant Examiner—Andrew C. Pike
Attorney, Agent, or Firm—Louise S. Heim

[57] ABSTRACT

A retractable roof is provided for mounting on a two-wheeled vehicle such as a motorcycle. The roof comprises a flexible waterproof canopy which is removably supported by a tubular metal frame movably secured to the vehicle. The frame includes a stationary base portion and an overhead portion including a front bow, central bow, and rear bow, all of which can be pivoted from an upright position over the seat of the vehicle to a lowered position parallel to the base portion and behind the seat. The central bow includes telescoping elements which allow it to be shortened when in the lowered position.

14 Claims, 2 Drawing Sheets

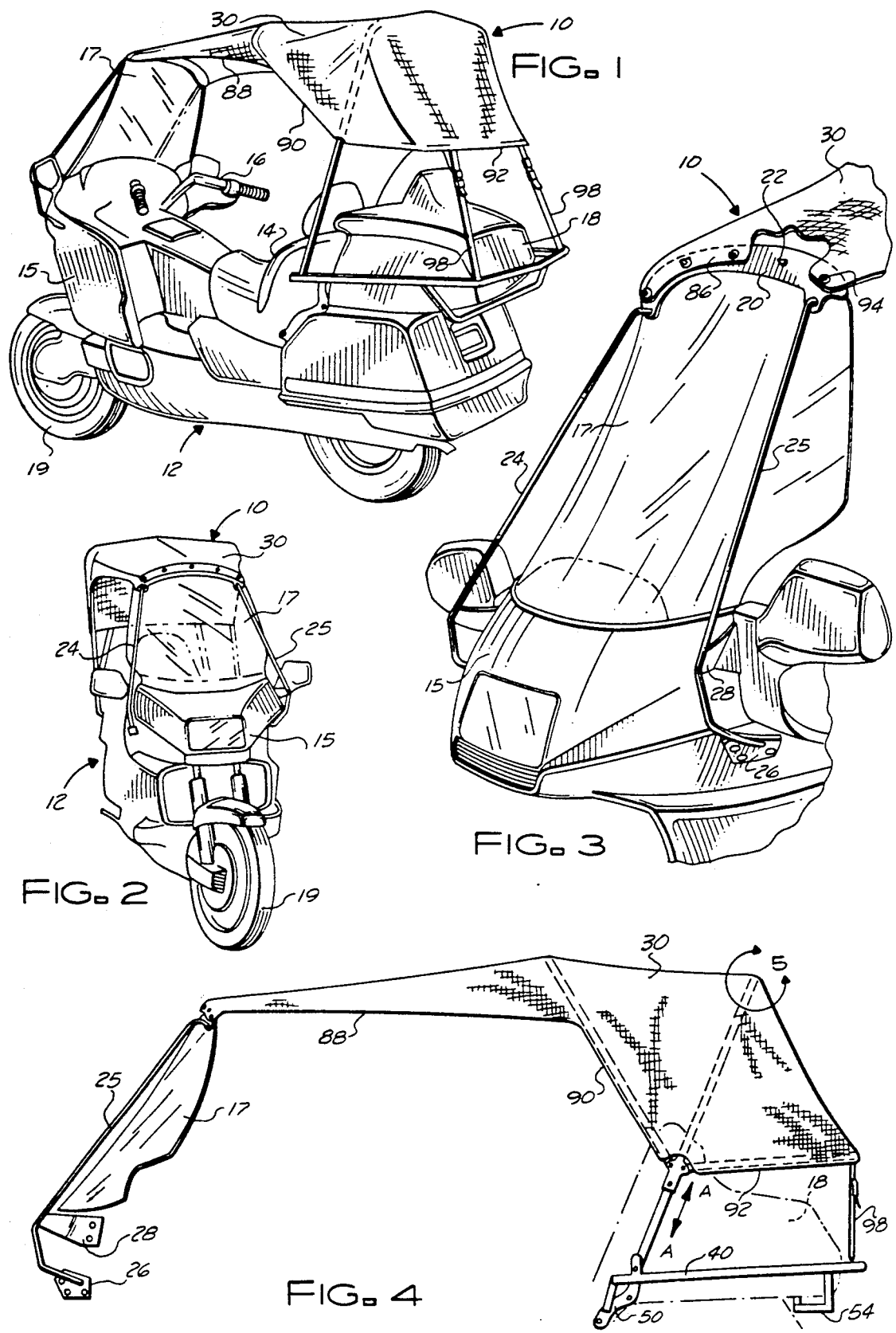

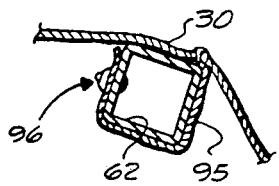
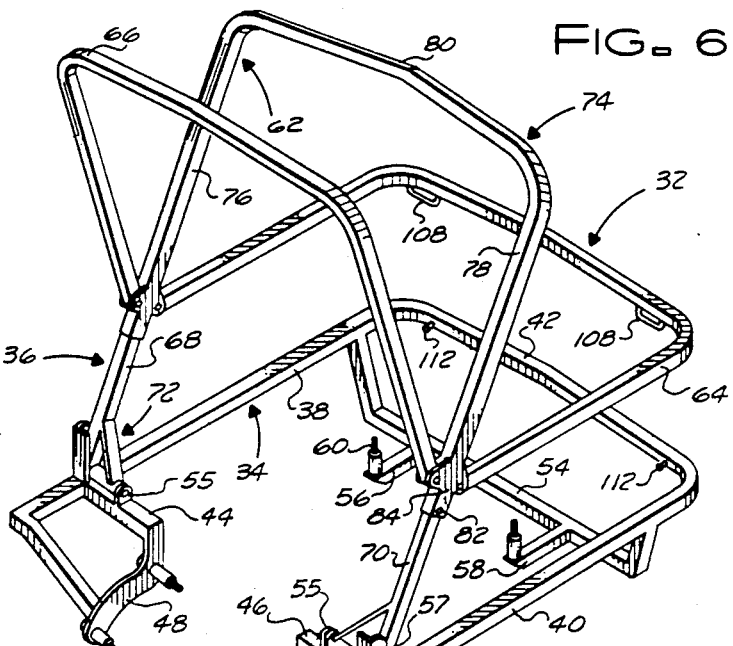
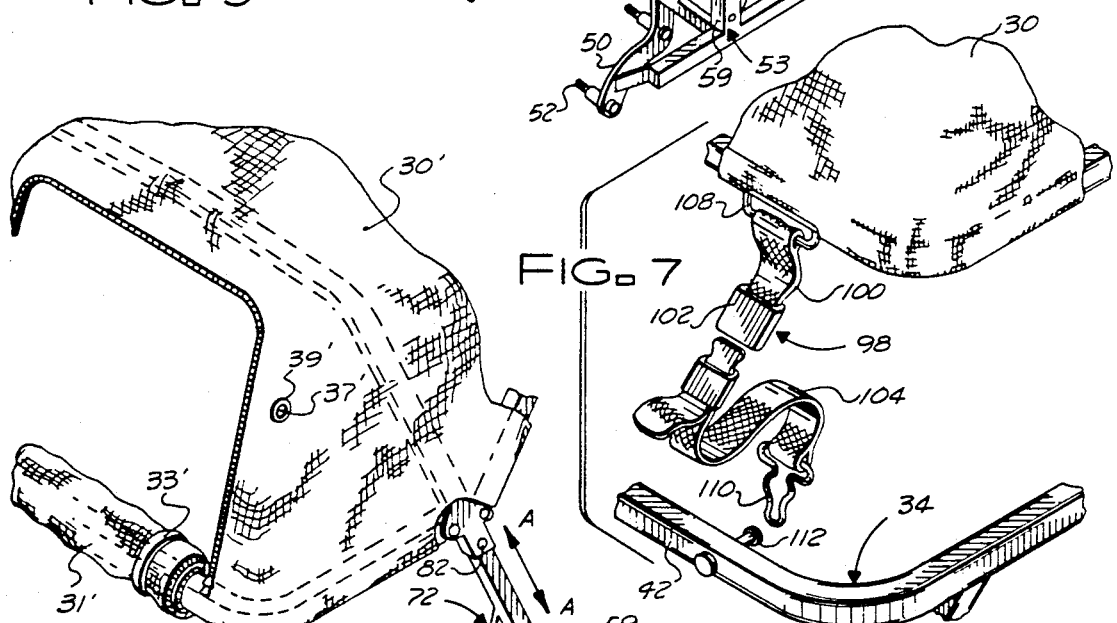
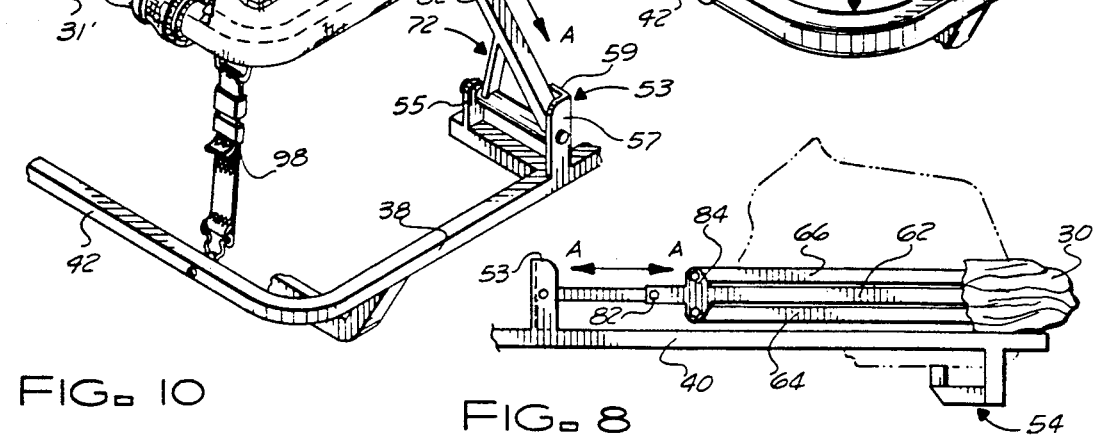
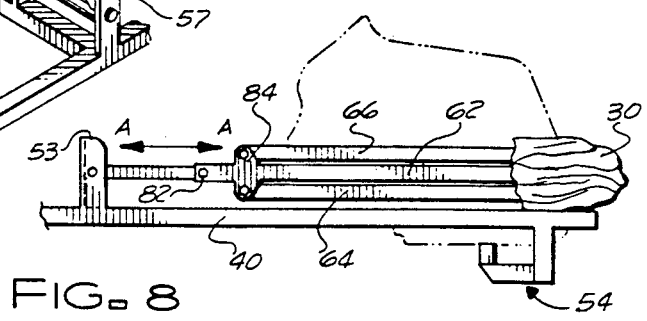
FIG. 5   FIG. 6   FIG. 9   FIG. 7   FIG. 10   FIG. 8

RETRACTABLE CYCLE ROOF

BACKGROUND OF THE INVENTION

1. Field of the Invention

This invention relates to the art of vehicular accessories.

More particularly, this invention relates to vehicle roofs.

In a further and more particular aspect, the instant invention concerns a retractable roof for a two-wheeled vehicle such as a motorcycle.

2. Description of the Prior Art

A good part of the appeal of riding a two-wheeled vehicle such as a motorcycle stems from the pleasurable sensation of riding in the open air, as opposed to the stuffy, constrained environment of a conventional enclosed automobile. This sensation is only pleasurable, however, when weather conditions are good. At other times, such as during rainstorms or periods of extreme heat or cold, the amount of discomfort which the rider experiences as a result of exposure to the elements may well outweight the benefits of the open air.

Until the present, there has been little that a cycle rider could do for protection from adverse weather conditions, except to dress appropriately. In cold weather, for instance, the rider could wear heavy clothing or add additional layers under or over his conventional dress. In hot weather, the rider could wear light clothing and add an extra large visor to his helmet to protect his face and eyes from sunburn. In rain. he could wear a poncho or raincoat. None of the above could offer full protection, however, since some part of the rider's body would always be left exposed.

Furthermore, proper dress protects only the driver, leaving portions of the bike, such as the seat and handlebars, vulnerable to the ravages of sun and rain. This is especially troublesome when the owner has spent a great deal of time and money customizing and caring for his bike.

Accordingly, a need exists for an overhead protection device for shielding the rider of a motorcycle from the effects of adverse weather.

Accordingly, it is an object of the present invention to provide a retractable roof for mounting on a two-wheeled vehicle such as a motorcycle.

Another object of the invention is the provision of an attractive fabric canopy for shielding a cycle rider from the sun.

And another object of the invention is to provide a motor cycle with a sturdy, durable frame for supporting a fabric canopy and preventing the canopy from collapsing at highway speeds.

Still another object of the invention is the provision of retractable cycle roof which can be raised and lowered in a manner of minutes.

Yet another object of the invention is to provide a cycle roof with a telescoping tubular frame which can be conveniently retracted to an out-of-the-way position when the roof is not in use.

Yet still another object of the invention is the provision of a cycle roof which provides adequate overhead protection while still allowing the rider to experience the sensation of open air travel when weather permits.

And a further object of the invention is to provide a cycle roof with a frame, canopy, and adjustable straps for maintaining the canopy in a taut configuration on the frame.

SUMMARY OF THE INVENTION

Briefly, to achieve the desired objects of the instant invention in accordance with the preferred embodiment thereof, a retractable roof is provided for mounting on a two-wheeled vehicle such as a motorcylce. The roof comprises a flexible waterproof canopy which is removably supported by a tubular metal frame movably secured to the vehicle.

In the preferred embodiment, the frame includes a stationary base portion which surrounds the back end of the vehicle, and an overhead portion which is pivotably secured to the base portion. The overhead portion includes a first arcuate bow member mounted for pivotable movement from an upright position over the head of the rider of the vehicle to a substantially horizontal position parallel with the base portion. The first arcuate bow member comprises a pair of straight rod elements pivotally coupled to opposite sides of the base portion and a tubular arch element having a pair of parallel legs which telescopically receive the rod elements to allow adjustment of the height of the bow member.

The overhead portion of the frame also includes a second arcuate bow member pivotably secured to one side of the first arcuate bow member, and a third arcuate bow member pivotably secured to the opposite side of the first arcuate bow member. Adjustable straps extend between the second bow member and the base portion of the frame to maintain the second bow member in a stable position relative to the base portion and to allow adjustment of the tension of the canopy.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 1 is a perspective view taken from the front of a touring motorcycle provided with a retractable roof according to the present invention.

FIG. 2 is a perspective view taken from the front of the touring motorcycle shown in FIG. 1.

FIG. 3 is an enlarged fragmentary perspective view taken from the front and side of the touring motorcycle shown in FIGS. 1 and 2, with a portion broken away to shown the manner in which the roof is coupled to the windshield.

FIG. 4 is a side view showing the roof and windshield assembly of the present invention.

FIG. 5 is sectional view taken through line 5—5 of FIG. 4.

FIG. 6 is a perspective view showing the frame of the roof according to the present invention.

FIG. 7 is a fragmentary perspective view taken from the rear, showing an adjustable strap coupling the movable portion of the frame to the stationary portion.

FIG. 8 is a fragmentary side view showing the frame of FIG. 6 in a retracted position.

FIG. 9 is a fragmentary rear view of a roof according to an alternative embodiment of the invention.

FIG. 10 is an enlarged fragmentary perspective view taken from the rear of the roof shown in FIG. 9, with the window flap secured in an open position.

DETAILED DESCRIPTION OF THE PREFERRED EMBODIMENT

Turning now to the drawings in which like reference characters indicate corresponding elements throughout the several views, attention is first directed to FIG. 1, which shows the roof of the present invention, indicated in its entirety by the numeral 10. The roof 10 is mounted on a touring motorcycle 12, including a seat 14, a fairing 15, a steering and handlebar assembly 16 movably mounted within fairing 15, windshield 17, and a storage trunk 18 located to the rear of seat 14.

Although the specific motorcycle illustrated is a Honda 1500 Gold Wing ®, it will be clear to the skilled practitioner that the roof 10 may be customized for mounting on a large variety of other vehicles. It is preferred however, that the vehicle selected includes a fairing-mounted windshield 17, as the top edge of such a windshield will provide a fixed surface to which the front edge of the roof 10 may be attached. A handlebar-mounted windshield would not be suitable, since the orientation of such a windshield relative to the back end of the vehicle would vary continually as the front wheel 19 is turned, thus making it impossible for the roof 10 to remain straight. If the selected vehicle is not already equipped with a fairing, it may easily be modified by adding an after-market fairing, as such fairings are widely available from a variety of commercial sources.

In addition, the height of windshield 17 is preferably greater than that of a standard motorcycle windshield. More specifically, the top edge of the windshield 17 should be located considerably above the eye level of a seated rider of average height, so that the rider will look through the windshield, rather than over it, as is usually the case. A height of about 5" greater than the height of a conventional windshield appears to be ideal. It is also recommended that the windshield 17 be treated with a water-repellent coating to ensure optimum visibility when the vehicle 12 is operated in the rain.

A rigid mounting band 20 comprising a number of male snap elements 22 or other fastening members is secured to the top edge of windshield 17. A pair of reinforcement rods 24, 25 extend along opposite sides of the windshield 17 to prevent the windshield from collapsing in response to the tension exerted by the roof 12 when the vehicle 10 is travelling at highway speeds. The top end of each rod 24, 25 is secured to the mounting band 20, and the bottom end is secured to a bracket 26 attached to the fairing 15. An additional brace member 28 may be mounted on the fairing above each of the brackets 26 for supporting an intermediate portion of each of the rods 24, 25 to prevent buckling of the rods under extreme conditions.

The roof 10 comprises a canopy 30 formed of relatively flexible waterproof material such as canvas. The canopy 30 is supported above the seat 14 of the motorcycle 12 by a retractable frame 32 formed of tubular steel elements.

The frame 32, as best seen in FIG. 6, comprises a stationary base portion 34 which is fixedly coupled to the rear portion of the motorcyle 12 and an overhead portion 36 which is mounted for pivotable movement from a use-position over the head of the rider to a non-use position away from the rider.

The base portion 34 of the frame 32 comprises a substantially U-shaped member including a pair of parallel legs 38, 40 which extend along opposite sides of the trunk 18 of the motorcycle 12 and a cross bar 42 which extends behind the rear of the trunk 18. The legs 38, 40 are spaced from the sides of the trunk 18 by a pair of inwardly turned arms 44, 46. Mounting brackets 48, 50 depend from the arms 44, 46 for receiving bolts 52 or other fasteners which secure the front portion of the base 34 to the sides of the trunk 18 or seat 14. A first upstanding hinge post 53 is formed at the intersection of each of the legs 38, 40 and the corresponding arm 44, 46. A second upstanding hinge post 55 is formed on each of the arms 44, 46 at a location spaced from the first hinge post 53. Each of the first hinge posts 53 includes a first planar portion 57, which is substantially coplanar with the outer surface of the corresponding leg 38 or 40, and a second planar portion 59, which extends at a right angle to the first planar portion 57 and acts as a stop for preventing the overhead portion 36 of the frame 32 from pivoting too far forwardly over the head of the rider.

At the rear portion of the base 34, near the cross bar 42, a secondary U-shaped member 54 depends from the legs 38, 40 and passes under the trunk 18. A pair of spaced apart arms 56, 58 extending inwardly at right angles to the bottom of U-shaped member 54 carry bolts 60 or other fasteners for securing the rear portion of the base 34 to the underside of trunk 18.

The overhead portion 36 of the frame 32 includes a set of arcuate members or bows, including a first, or central, bow 62, a second, or rear, bow 64 and a third, or front, bow 66. The first bow 62 includes a pair of straight rod elements 68, 70, each of which is forked at its bottom end to form a triangulated support 72. The bottom corners of triangulated support 72 are pivotably coupled to the hinge posts 53, 55 projecting from the stationary base 34, thus allowing movement of the first bow member 62 from an upright position over the head of the rider to a substantially horizontal position surrounding the back end of the trunk 18 and parallel to the base 34. The first bow member also includes a tubular arch element 74 comprising a pair of parallel legs 76, 78 which extend substantially perpendicularly from the opposite ends of a crossbar member 80. Each of the legs 76, 78 telescopically receives one of the rod elements 68, 70 to allow sliding movement of the arch element 74 relative to the rod elements 68, 70, as shown by the double-arrowed line. When in the fully extended position, the arch element 74 is fixed to the rod elements 68, 70 by means of a spring-biased detent 82 or other locking means such as are well known in the art.

Near the bottom of each leg 76, 78 of the arch element 74, just above the open end which receives rod element 68 or 70, there is formed a triangular double tang 84 having a pair of opposite projecting corners to which the bottom ends of second and third bows 64 and 66 are pivotably secured. The triangular configuration of the tang 84 allows the second and third bows 64 and 66 to be pivoted from a first position forming an angle with the first bow member 62 when the first bow member 62 is in its upright position, as seen in FIG. 6, to a second position parallel to the first bow member 62 when the first bow member 62 is in its substantially horizontal position, as seen in FIG. 8.

The canopy 30 comprises a plurality of edges including a front edge 86 which is configured to substantially match the size and shape of the upper edge of the motorcycle windshield 17. Also included are a pair of first side edges 88 which extend between the front edge 86 and the opposite legs of the front bow 66 when the roof 10 is in its fully extended position, a pair of second side edges 90 which extend along the legs of the front bow 66, and a bottom edge 92 which extends along the rear bow 64. The front edge 86 of the canopy is secured to the top edge of the windshield 17 by a plurality of female snap elements 94 or other fasteners which mate with the male elements 22 provided on the mounting band 20. The second side edges 90 and bottom edge 92 of the canopy are wrapped around front bow 66 and rear bow 64, respectively, and snapped into place using mating snap elements (not shown) on the edges of the canopy and on the bows 66 and 64. The central portion of the canopy 30 is secured to the central bow 62 by means of an auxiliary flap 95 which depends from the underside of the canopy 30, as shown in FIG. 5. The auxiliary flap 95 is wrapped around the central bow 62 and secured in place by mating snap elements 96 on the edge of the flap 95 and on the front side of the central bow 62.

The tension of the canopy 30 on the frame 32 is determined by the position of the rear bow 64 relative to the stationary base portion 34. This can be controlled by a pair of adjustable straps 98 which extend between the rear bow 64 and the cross bar 42 of the base 34. As best seen in FIG. 7, each strap 98 comprises a first strip of webbing material 100, which carries a female fitting element 102, and a second strip of webbing material 104, which carries a male fitting element 106 removably receivable in the female element 102. The male fitting element 106 is slidably mounted on the second strip 104 to allow variation of the effective width of the strap 98. The upper end of the first strip of webbing material 100 is carried on a ring 108 depending from the rear bow 64, and the lower end of the second strip 104 carries a clasp 110 which demountably engages a pin 112 projecting from the inner surface of the cross bar 42.

In an alternate embodiment of the invention, illustrated in FIGS. 9 and 10, the rear portion of the canopy 30' may be provided with a zippered flap 31', which allows fresh air to flow through the canopy under pleasant weather conditions. When the flap 31' is unzipped, it may be conveniently wound around the back of the rear bow 64 of the frame and secured in place using bands or ties 33'. The flap 31' may also be provided with an aperture 35' covered with a transparent protective material such as plastic to allow the rider to see out the back when the flap 31' is up. An additional feature of the alternate canopy 30' is a small circular opening 37' formed in the rear or side for allowing a radio antenna to extend through the canopy. The opening 37' is preferably surrounded by a washer 39' or the like for preventing leakage into the opening.

Raising and lowering of the roof 10 can be accomplished in a matter of minutes. Normally, the roof is stored in the lowered position, as shown in FIG. 8. To raise it, the operator first slides the arch element 74 of the central bow 62 outwardly along the rod elements 68, 70, and locks the arch element into its fully extended position using detent 82. The central bow 62 is then pivoted in a counterclockwise direction until it reaches the upright position shown in FIG. 7. The rear bow 64 is then pivoted clockwise and the front bow 66 is pivoted counterclockwise until they assume the positions shown. Next, the bottom portion 104 of each of the adjustable straps 98 is secured to pins 112 and male elements 106 are inserted in female elements 102 to secure the rear bow 64 in a fixed position relative to the base 34 of the frame. Finally, the canopy 30 is positioned across the bows 62, 64, 66 and secured to the windshield 17.

To lower the roof 10, the procedure is simply reversed. Before the roof is lowered, the canopy 30 may be entirely removed from the frame 32, folded, and stored in the trunk 18 of the motorcycle, or the side and rear edges 90, 92 may remain coupled to the frame while the front portion is folded or wound around the bows 62, 64 and 66 in any convenient fashion.

Various modifications and variations to the embodiments herein chosen for purposes of illustration will readily occur to those skilled in the art. To the extent that such variations and modifications do not depart from the spirit of the invention, they are intended to be included within the scope thereof which is assessed only by a fair interpretation of the following claims.

Having fully described and disclosed the instant invention and alternately preferred embodiments thereof in such clear and concise terms as to enable those skilled in the art to understand and practice the same, the invention claimed is:

1. A roof for protecting a rider of a two-wheeled vehicle having a front end and a back end from rain and excessive sunlight, said roof comprising:
   a) a waterproof canopy;
   b) frame means coupled to said vehicle for supporting said canopy, said frame means including a stationary portion and a movable portion;
   c) coupling means for securing said canopy to said frame means; and
   d) pivot means for pivotably securing said movable portion of said frame means to said stationary portion for movement from a substantially vertical position over the rider to a substantially horizontal position surrounding the back end of the vehicle, said pivot means including
      i) a pair of hinge posts carried by said stationary portion,
      ii) pin means extending through each of said hinge posts and through said movable portion, and
      iii) stop means for preventing said movable portion from pivoting too far forwardly relative to said stationary portion, said stop means comprising a flange extending normally to each of said hinge posts and forwardly of said movable portion.

2. A roof according to claim 1, wherein said coupling means comprises demountable fastening means for allowing said canopy to be readily removed from said frame means.

3. A roof according to claim 1, wherein said frame means comprises a plurality of tubular metal elements.

4. A roof according to claim 1, wherein said movable portion comprises a first arcuate bow member mounted for pivotable movement from said substantially vertical position to said substantially horizontal position.

5. A roof according to claim 4, wherein said first arcuate bow member comprises:
   a) a pair of straight rod elements, each pivotably coupled to an opposite side of the vehicle; and
   b) a tubular arch element including a pair of parallel legs extending substantially perpendicularly from opposite ends of a crossbar member, each of said legs telescopically receiving one of said straight rod elements to allow sliding movement of said arch element relative to said rod elements.

6. A roof according to claim 4, wherein said movable portion further comprises:

a) a second arcuate bow member pivotably coupled to one side of said first arcuate bow member; and b) a third arcuate bow member pivotably coupled to an opposite side of said first arcuate member.

7. A roof for protecting a rider of a two-wheeled vehicle, the vehicle including a seat, a fixed fairing formed forwardly of the seat, said fairing having a front and a back, a windshield secured to the front of the fairing, a steering assembly mounted for movement within the fairing, and a storage area formed rearwardly of the seat, said storage area having a front portion and a rear portion, said roof comprising:

a) a waterproof canopy formed of flexible material, said canopy including a front edge;

b) frame means for supporting said canopy, said frame means including i) a stationary base portion for surrounding the storage area of the vehicle, said base portion including a substantially horizontal, U-shaped member including a pair of parallel legs for extending along opposite sides of the storage area of the vehicle and a crossbar member joining said parallel legs for extending across the rear portion of the storage area, ii) an overhead portion including a first arcuate bow member mounted for pivotable movement from an upright position over the rider to a substantially horizontal position parallel to said U-shaped member of said stationary base portion, and iii) pivot means for pivotably securing said overhead portion to said base portion, said pivot means including i) a pair of upstanding hinge posts carried by the parallel legs of said U-shaped member;

ii) pin means extending through each of said hinge posts and corresponding sides of said first arcuate bow member for coupling said bow member to said hinge posts; and iii) flange means extending normally to each of said hinge posts and forwardly of said first arcuate bow member, said flange means acting as a stop for preventing said first arcuate bow member from pivoting too far forwardly relative to said base portion;

c) first coupling means for securing said canopy to the overhead portion of said frame means; and d) second coupling means for securing the base portion of said frame means to the storage area of the vehicle.

8. A roof according to claim 7, wherein said first coupling means comprises demountable fastening means for allowing said canopy to be readily removed from said frame means.

9. A roof according to claim 7, further comprising third coupling means for securing the front edge of said canopy to the windshield of the vehicle.

10. A roof according to claim 9, wherein said third coupling means comprises demountable fastening means for allowing the front edge of said canopy to be readily detached from the windshield.

11. A roof according to claim 7, wherein said first arcuate bow member comprises:

a) a pair of straight rod elements, each pivotably coupled to an opposite side of said first bow member; and b) a tubular arch element including a pair of parallel legs extending substantially perpendicularly to opposite ends of a crossbar member, each of said legs telescopically receiving one of said straight rod elements to allow sliding movement of said arch element relative to said rod elements.

12. A roof according to claim 7, wherein the overhead portion of said frame means further comprises:

a) a second arcuate bow member coupled to one side of said first bow member and mounted for pivotable movement from a first position forming an angle with said first bow member when said first bow member is in said upright position to a second position parallel to said first bow member when said first bow member is in said substantially horizontal position; and b) a third arcuate bow member coupled to an opposite side of said first bow member and mounted for pivotable movement from a first position forming an angle with said first bow member when said first bow member is in said upright position to a second position parallel to said first bow member when said first bow member is in said substantially horizontal position.

13. A roof according to claim 12, further comprising strap means extending from said second arcuate bow member to said U-shaped member for maintaining said second bow member in a stable position relative to said U-shaped member, said strap means having a variable length.

14. In a touring motorcycle comprising a seat, a fixed fairing formed forwardly of the seat, said fairing having a front portion and a rear portion, a steering assembly mounted for movement within the fairing, and a storage area formed rearwardly of the seat, the improvement wherein said motorcycle includes:

a) an extended windshield secured to the front portion of the fairing, said windshield having a free top edge;

b) a retractable roof for protecting a rider from rain and excessive sunlight, said roof including i) a waterproof canopy having a front edge and a rear edge, ii) frame means supporting said canopy and mounted for pivotable movement from a use position over the rider to a non-use position away from the rider, iii) first coupling means securing the canopy to said frame means, iv) second coupling means securing said frame means to said motorcycle, and v) third coupling means demountably securing the front edge of said canopy to the top edge of said windshield; and c) brace means for supporting said windshield both when said frame means is in said use position and when said frame means is in said non-use position, said brace means including a pair of spaced apart reinforcement rods, each of said rods having a lower end attached to said fairing at a location spaced forwardly of said windshield and an upper end attached to said top edge of said windshield.

* * * * *